(12) United States Patent
Huang

(10) Patent No.: US 11,551,594 B2
(45) Date of Patent: Jan. 10, 2023

(54) DISPLAY PANEL AND DISPLAY DEVICE HAVING REINFORCING LAYER UNDER PROTECTIVE LAYER CORRESPONDING TO NON-DISPLAY AREA

(71) Applicant: Wuhan China Star Optoelectronics Semiconductor Display Technology Co., Ltd., Hubei (CN)

(72) Inventor: Hai Huang, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 90 days.

(21) Appl. No.: 17/054,782

(22) PCT Filed: Jul. 22, 2020

(86) PCT No.: PCT/CN2020/103558
§ 371 (c)(1),
(2) Date: Nov. 12, 2020

(87) PCT Pub. No.: WO2021/253565
PCT Pub. Date: Dec. 23, 2021

(65) Prior Publication Data
US 2022/0130303 A1 Apr. 28, 2022

(30) Foreign Application Priority Data
Jun. 15, 2020 (CN) .......................... 202010544644.2

(51) Int. Cl.
*G09G 3/00* (2006.01)

(52) U.S. Cl.
CPC .................................... *G09G 3/035* (2020.08)

(58) Field of Classification Search
CPC ..... G09G 3/035; G02F 1/13454; B32B 17/10; H01L 51/5253; H01L 27/3244; H01L 51/524; G06F 1/1681; G09F 9/301
See application file for complete search history.

(56) References Cited

U.S. PATENT DOCUMENTS

2016/0357052 A1   12/2016 Kim et al.
2017/0194580 A1*  7/2017 Lee ..................... H01L 51/5253
(Continued)

FOREIGN PATENT DOCUMENTS

CN   103593080   2/2014
CN   104699299   6/2015
(Continued)

*Primary Examiner* — Richard J Hong
(74) *Attorney, Agent, or Firm* — PV IP PC; Wei Te Chung; Ude Lu

(57) ABSTRACT

A display panel and a display device are provided. The display panel includes a module layer and a protective layer, a stiffness of the protective layer corresponding to a non-display area of the display panel is greater than a stiffness of the protective layer corresponding to a display area, and the display panel is further provided with a reinforcing layer in the non-display area at a same time. The present disclosure can effectively support the protective layer in the non-display area and prevent dents of the display panel by the reinforcing layer, thereby improving reliability and quality of the display panel.

17 Claims, 6 Drawing Sheets

(56) References Cited

U.S. PATENT DOCUMENTS

| | | | |
|---|---|---|---|
| 2017/0232701 A1* | 8/2017 | Keite-Telgenbüscher | ............... B32B 17/10 428/189 |
| 2018/0149904 A1 | 5/2018 | Song et al. | |
| 2018/0224688 A1* | 8/2018 | Chen | ............ G02F 1/13454 |
| 2020/0004296 A1 | 1/2020 | Lee et al. | |
| 2020/0008308 A1 | 1/2020 | Shin et al. | |
| 2020/0008309 A1 | 1/2020 | Kim et al. | |
| 2020/0119293 A1 | 4/2020 | Park et al. | |
| 2020/0194723 A1 | 6/2020 | Liu et al. | |
| 2020/0411777 A1* | 12/2020 | Seo | ............ H01L 27/3244 |
| 2021/0065589 A1* | 3/2021 | Wang | ............... G09F 9/301 |
| 2021/0104694 A1* | 4/2021 | Yee | ............... G06F 1/1681 |
| 2021/0249614 A1* | 8/2021 | An | ............... H01L 51/524 |

FOREIGN PATENT DOCUMENTS

| | | |
|---|---|---|
| CN | 105116965 | 12/2015 |
| CN | 105892154 | 8/2016 |
| CN | 106252378 | 12/2016 |
| CN | 106710449 | 5/2017 |
| CN | 108122489 | 6/2018 |
| CN | 208622780 | 3/2019 |
| CN | 109727537 | 5/2019 |
| CN | 110335546 | 10/2019 |
| CN | 110428735 | 11/2019 |
| CN | 110429108 | 11/2019 |
| CN | 110517588 | 11/2019 |
| CN | 110544431 | 12/2019 |
| CN | 110767086 | 2/2020 |
| CN | 110854295 | 2/2020 |
| JP | 2011-108564 | 6/2011 |

* cited by examiner

DISPLAY PANEL AND DISPLAY DEVICE HAVING REINFORCING LAYER UNDER PROTECTIVE LAYER CORRESPONDING TO NON-DISPLAY AREA

RELATED APPLICATIONS

This application is a National Phase of PCT Patent Application No. PCT/CN2020/103558 having International filing date of Jul. 22, 2020, which claims the benefit of priority of Chinese Patent Application No. 202010544644.2 filed on Jun. 15, 2020. The contents of the above applications are all incorporated by reference as if fully set forth herein in their entirety.

FIELD AND BACKGROUND OF THE INVENTION

The present disclosure relates to the field of display technologies, and more particularly, to a display panel and a display device.

With rapid development of display technologies, a breakthrough progress has been made in quality and performances of display panels, and in particular, applications of flexible display panels attract attention.

At present, flexible display screens are favored by users due to their unique flexible and foldable characteristics, and more and more foldable flexible panels are introduced to the market. In order to facilitate folding and use of flexible panels, when in design, softer functional display materials are usually used for production. However, since display film layers and protective film layers manufactured are softer, when touching or folding the flexible display screens or when a touching force or a bending force is too large during use, collapse or dents are extremely prone to happen in bezel areas and unsupported areas of display panels, thereby damaging the flexible display screens and reducing user experiences. Meanwhile, the flexible display panels have problems such as uneasy to be bent when bending, thereby affecting performance of the display panels.

Therefore, it is necessary to provide a solution for the problems in current technology.

Technical problem: in summary, dents or collapse are prone to happen in bezel areas and unsupported areas of current flexible display panels when touching or operating, thereby affecting normal use of the flexible display panels and even damaging the flexible display panels, which are not beneficial for improving comprehensive performance of the flexible display panels.

SUMMARY OF THE INVENTION

In order to solve the above problems, the present disclosure provides a display panel and a display device to solve the problems that flexible screens are prone to have dent or collapse situations and are not prone to be bent in bezel areas and unsupported areas of current display panels, especially flexible display panels, when touching or operating, thereby affecting or even damaging the flexible display panels.

To solve the above technical problems, an embodiment of the present disclosure provides technical solutions as follows:

A first aspect of an embodiment of the present disclosure provides a display panel. The display panel has a display area and a non-display area surrounding the display area and includes:

a module layer; and
a protective layer disposed on the module layer;
wherein a stiffness of the protective layer corresponding to the non-display area is greater than a stiffness of the protective layer corresponding to the display area; and
the display panel further includes a reinforcing layer disposed on one side of the protective layer adjacent to the module layer, the protective layer corresponding to the non-display area is provided with grooves, and the reinforcing layer is disposed in the grooves and attached to the protective layer.

According to an embodiment of the present disclosure, the reinforcing layer is disposed in the non-display area corresponding to the protective layer to support the protective layer.

According to an embodiment of the present disclosure, the display panel further includes an adhesive layer disposed between the reinforcing layer and the protective layer.

According to an embodiment of the present disclosure, the display panel includes a planarization area and a bending area adjacent to each other, wherein the display panel corresponding to the bending area is bendable.

According to an embodiment of the present disclosure, the reinforcing layer corresponding to the bending area is provided with patterned structures.

According to an embodiment of the present disclosure, a planar shape of the patterned structures includes porous, square, rhombic, oval, or a combination thereof.

According to an embodiment of the present disclosure, the patterned structures include discontinuous grid structures.

According to an embodiment of the present disclosure, the module layer includes a polarizer layer, an insulating layer, a display device layer, and a backplate layer disposed in sequence, and the protective layer includes a glass cover.

A second aspect of an embodiment of the present disclosure provides a display panel. The display panel has a display area and a non-display area surrounding the display area and includes:

a module layer; and
a protective layer disposed on the module layer;
wherein a stiffness of the protective layer corresponding to the non-display area is greater than a stiffness of the protective layer corresponding to the display area.

According to an embodiment of the present disclosure, the display panel further includes a reinforcing layer disposed on one side of the protective layer adjacent to the module layer, and the reinforcing layer is disposed in the non-display area corresponding to the protective layer to support the protective layer.

According to an embodiment of the present disclosure, the protective layer corresponding to the non-display area is provided with grooves, and the reinforcing layer is disposed in the grooves and attached to the protective layer.

According to an embodiment of the present disclosure, the display panel further includes an adhesive layer disposed between the reinforcing layer and the protective layer.

According to an embodiment of the present disclosure, the display panel includes a planarization area and a bending area adjacent to each other, wherein the display panel corresponding to the bending area is bendable.

According to an embodiment of the present disclosure, the reinforcing layer corresponding to the bending area is provided with patterned structures.

According to an embodiment of the present disclosure, a planar shape of the patterned structures includes porous, square, rhombic, oval, or a combination thereof.

According to an embodiment of the present disclosure, the patterned structures include discontinuous grid structures.

According to an embodiment of the present disclosure, the module layer includes a polarizer layer, an insulating layer, a display device layer, and a backplate layer disposed in sequence, and the protective layer includes a glass cover.

A third aspect of the present disclosure provides a display device. The display device includes the display panel provided by the embodiments of the present disclosure. The display panel has a display area and a non-display area surrounding the display area and includes:

a module layer; and a protective layer disposed on the module layer;

wherein a stiffness of the protective layer corresponding to the non-display area is greater than a stiffness of the protective layer corresponding to the display area.

According to an embodiment of the present disclosure, the display panel further includes a reinforcing layer disposed on one side of the protective layer adjacent to the module layer, and the reinforcing layer is disposed in the non-display area corresponding to the protective layer to support the protective layer.

According to an embodiment of the present disclosure, the protective layer corresponding to the non-display area is provided with grooves, and the reinforcing layer is disposed in the grooves and attached to the protective layer.

Beneficial effect: in summary, beneficial effects of the embodiments of the present disclosure are that since each film layer of the display panel, especially a flexible display panel, is softer and bendable or foldable, and in the embodiments, since a flexible screen has no film layer for supporting at edges or bezels of the display panel, the present disclosure disposes the reinforcing layer in the non-display area of the bezels of the display panel, specifically in the non-display area corresponding to edges of the protective layer, to make a stiffness of the protective layer corresponding to this area greater than a stiffness of the protective layer corresponding to the display area of the display panel, thereby improving the stiffness of the protective layer in this area and effectively preventing problems that flexible film layers are prone to collapse and dent when touching and operating the flexible display panel.

DESCRIPTION OF SPECIFIC EMBODIMENTS OF THE INVENTION

The specific embodiments described with reference to the attached drawings are all exemplary and are intended to illustrate and interpret the present disclosure.

Figure 1A:
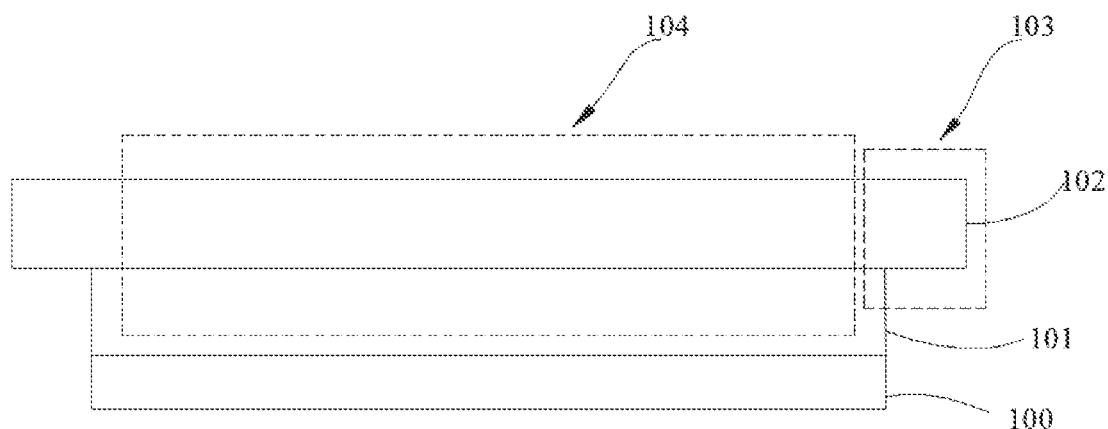
FIG. 1A is a schematic film layer structural diagram of a display panel according to an embodiment of the present disclosure.

In an embodiment of the present disclosure, as shown in FIG. 1A, FIG. 1A is a schematic film layer structural diagram of a display panel according to an embodiment of the present disclosure. The display panel includes a substrate 100, a module layer 101, and a protective layer 102. Wherein, the module layer 101 is disposed on the substrate 100, and the protective layer 102 is disposed on the module layer 101.

In this embodiment, the display panel further includes a display area 104 and a non-display area 103. The display area 104 mainly displays images, and the non-display area 103 is defined surrounding the display area 104. Since current display devices cannot fully realize bezel-free, the non-display area 103 is mainly defined at an edge area of the display panel, that is, close to surrounding bezels of the display panel.

Under conventional situations, in order to realize a full screen display panel as much as possible, the module layer of the display panel is mainly disposed in an area corresponding to the display area 104 and is not disposed in an area corresponding to the non-display area 103. However, for a touch panel in this structure, when touching in the non-display area 103, since there is no film layer to support the protective layer 102, dents or collapse of the panel will happen, thereby affecting user experiences.

In an embodiment of the present disclosure, a stiffness of the protective layer 102 corresponding to the non-display area 103 is greater than a stiffness of the protective layer 102 corresponding to the display area 104. In this way, when touching and operating in the display area 104, since the display area 104 is supported by the module layer 101, normal touch and operation can be performed, while touching and operating in the non-display area 103, since a stiffness of a material in the non-display area 103 is greater, a force of touch and operation is not able to dent the protective layer 102, thereby protecting and supporting the protective layer 102 in the non-display area 103.

Figure 1B:
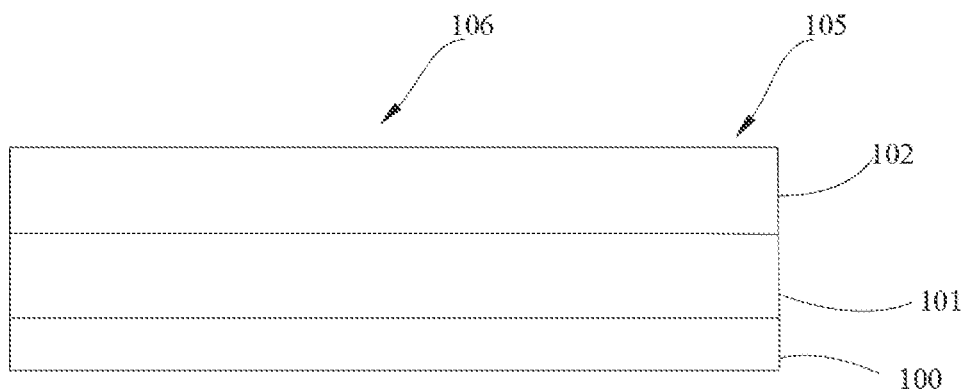
FIG. 1B is a schematic film layer structural diagram of another display panel according to an embodiment of the present disclosure.

Preferably, as shown in FIG. 1B, FIG. 1B is a schematic film layer structural diagram of another display panel according to an embodiment of the present disclosure. Combined with the schematic film layer structural diagram of FIG. 1A, in this embodiment, sides of the module layer 101 and the protective layer 102 may be flush with each other.

Meanwhile, the display panel includes an edge area 105 and a non-edge area 106. Problems such as dents can be prevented when touching or bending the display panel by strengthening film layers corresponding to the edge area 105. Therefore, a reinforcing layer structure can be disposed on the film layers corresponding to the edge area 105 to prevent denting a screen, thereby improving reliability of the display panel.

Meanwhile, a design structure of the embodiment of the present disclosure will not increase a thickness of entire display panel and a width and a thickness of bezels, thereby realizing a design of light and thin display panels, and improving user experiences and quality of the display panel.

Figure 2A:
FIG. 2A is another schematic structural diagram of a display panel according to an embodiment of the present disclosure.

Further, as shown in FIG. 2A, FIG. 2A is another schematic structural diagram of a display panel according to an embodiment of the present disclosure. The display panel includes a module layer 200, a reinforcing layer 202, and a protective layer 201. Wherein, the reinforcing layer 202 is disposed on one side of the protective layer 201 adjacent to the module layer 200, that is, the reinforcing layer 202 is disposed between the protective layer 201 and the module layer 200, and the reinforcing layer 202 is disposed in the non-display area 103 of the display panel.

When disposing, a part of the reinforcing layer 202 may be attached to the module layer 200 and the protective layer 201 correspondingly, and another part of the reinforcing layer 202 may extend outside the module layer 200 and be attached to the protective layer 201. In this way, when touching the protective layer 201 in the non-display area 103, since the disposed reinforcing layer 202 can support the protective layer 201 in the non-display area 103, a stiffness of the protective layer 201 in this area can be increased, thereby preventing denting the protective layer 201 and improving the quality and reliability of the display panel.

Since the reinforcing layer 202 mainly plays a supporting role, in this embodiment, a contact area between the reinforcing layer 202 and the module layer 200 may be less than an area corresponding to the reinforcing layer 202 extending outside the module layer 200. Alternatively, when disposing, the contact area between the reinforcing layer 202 and the module layer 200 may be same as the area corresponding to the reinforcing layer 202 extending outside the module layer 200.

Figure 2B:
FIG. 2B is a schematic structural diagram of a reinforcing layer according to an embodiment of the present disclosure.

Further, as shown in FIG. 2B, FIG. 2B is a schematic structural diagram of the reinforcing layer according to an embodiment of the present disclosure. When disposing the reinforcing layer 202, grooves or step structures 203 can be defined on the protective layer 201 corresponding to the non-display area 103, and the grooves or the step structures 203 may be a ring shape surrounding a boundary layer of the protective layer 201. Meanwhile, the reinforcing layer 202 is embedded in the steps 203 or the grooves, and the reinforcing layer 202 is attached to the protective layer 201. In this way, the stiffness of the protective layer 201 in the non-display area 103 is increased without increasing a thickness of the protective layer 201, thereby realizing the design of the light and thin display panel. Meanwhile, consistency of overall thickness of the protective layer 201 can also be effectively ensured, thereby effectively reducing the thickness of the display panel and improving quality and reliability requirement of the display panel.

Preferably, an adhesive layer can also be disposed between the reinforcing layer 202 and the protective layer 201. The adhesive layer may be a glue layer or an ink layer, and the reinforcing layer 202 and the protective layer 201 can be attached to each other by the glue layer or the ink layer.

In this embodiment of the present disclosure, the reinforcing layer 202 may be a high strength material. When manufacturing the reinforcing layer 202, it can be a liquid coating before being combined with the protective layer 201, which is coated on the protective layer 201 corresponding to the non-display area 103, and the protective layer 201 corresponding to the non-display area 103 can be completely coated or coated at intervals when spray coating. After the coating is completed, it is cured, and finally the reinforcing layer 202 is formed. After the reinforcing layer 202 is finally formed, a thickness of the reinforcing layer 202 preferably ranges from 10 um to 300 um.

Preferably, a material of the reinforcing layer 202 may also be a high strength metal, alloy, or polymer coating, or a combination of the above materials. The metal material may include molybdenum, nickel, etc. The module layer 200 is mainly a light-emitting device layer, a display layer, and other film layers of the display panel. The protective layer 201 may be a glass cover or may also be a transparent material such as conventional polyimide material or sapphire. The protective layer 201 is mainly configured to protect and seal other film layers.

In an embodiment of the present disclosure, the ink layer may also be disposed between the reinforcing layer 202 and the protective layer 201. Meanwhile, the ink layer is disposed in an area corresponding to the non-display area 103, and a material of the ink layer may be a liquid ink or an ink paper. When the ink paper is used, the ink paper is attached to the reinforcing layer 202 and then combined with the protective layer 201, thereby supporting the protective layer 201 in the non-display area 103. Wherein, a thickness of the ink preferably ranges from 1 um to 30 um.

Figure 3:
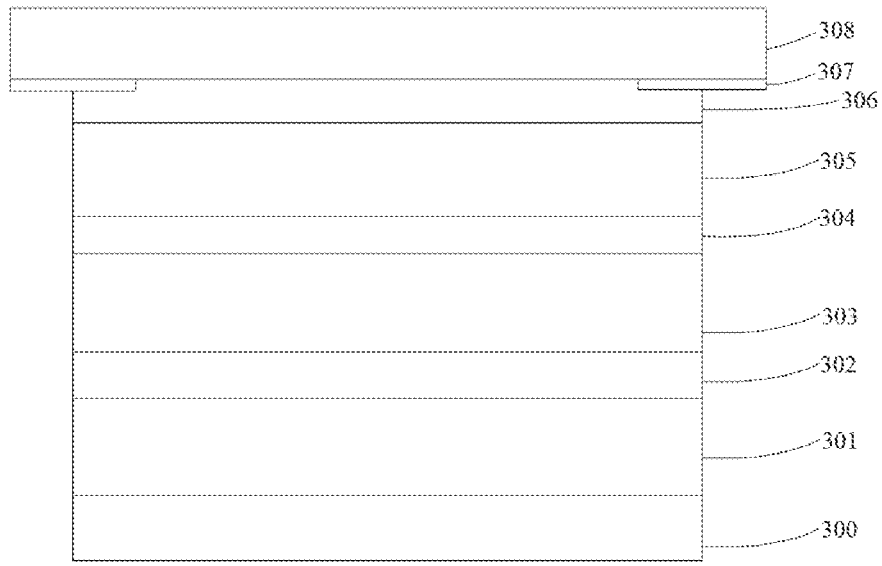
FIG. 3 is yet another schematic structural diagram of a display panel according to an embodiment of the present disclosure.

As shown in FIG. 3, FIG. 3 is yet another schematic structural diagram of a display panel according to an embodiment of the present disclosure. The display panel includes a middle frame 300, a backplate layer 301, a first passivation layer 302, a display layer 303, a second passivation layer 304, a polarizer layer 305, a third passivation layer 306, a reinforcing layer 307, and a protective layer 308 disposed in sequence from bottom to top. The reinforcing layer 307 is mainly disposed in a non-display area, thereby supporting the protective layer 308 in the non-display area without affecting functions of each film layer in a display area and effectively improving reliability of the display panel. Meanwhile, a manufacturing process of the display panel in the embodiments of the present disclosure is simple, and production cost is low, which is beneficial for mass production manufacturing.

Figure 4:
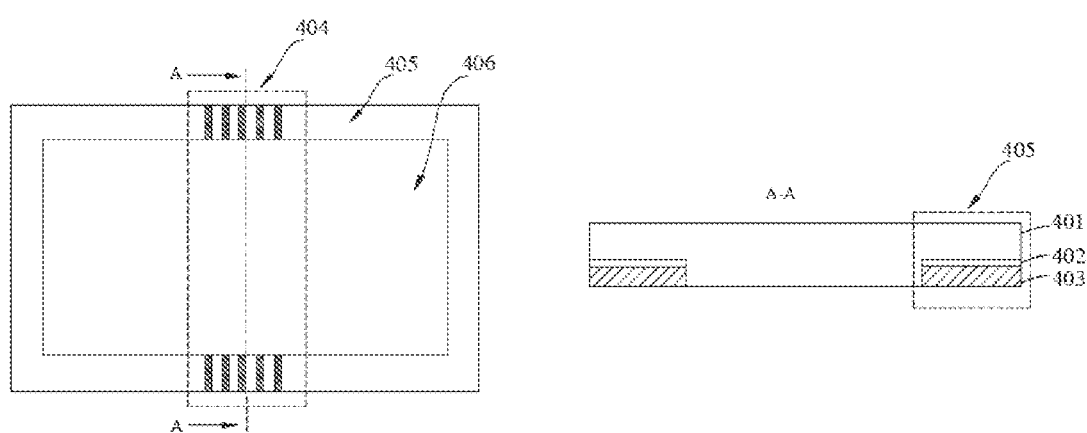
FIG. 4 is a partial schematic film layer diagram of a flexible panel and a schematic cross-sectional diagram thereof along an A-A direction according to an embodiment of the present disclosure.

As shown in FIG. 4, FIG. 4 is a partial schematic film layer diagram of a flexible panel and a schematic cross-sectional diagram thereof along an A-A direction according to an embodiment of the present disclosure. The display panel includes a display area 406 and a non-display area 405 surrounding the display area. Combined with FIGS. 2A to 3 at a same time, the display panel includes a protective layer 401, an ink layer 402, and a reinforcing layer 403. In this embodiment, the display panel is a flexible display panel and includes a bending area 404 and a planarization area adjacent to the bending area 404. When the flexible display panel is bent, bending mainly occurs in the bending area 404.

Therefore, when disposing a structure in the bending area 404 corresponding to the non-display area 405, the reinforcing layer 403 corresponding to the bending area can be patterned, thereby disposing the reinforcing layer 403 corresponding thereto as patterned structures. The patterned structures may include hollowed-out structures or grid structures, that is, the reinforcing layer 403 is gridded in this area to form the grid structures. The grid structures may be grid structures disposed continuously or discontinuously. When the grid structures are disposed as discontinuous structures, the reinforcing layer 403 forms a structure having interlaced solid body and grid, and solid body structures can effectively fix and support film layers. A specific structure can be set according to an actual situation of the reinforcing layer 403 and the bending area 404, thereby ensuring and improving bendability of the reinforcing layer 403. When the display panel is bent, bending is more prone to occur in the bending area 404, so this embodiment effectively improves bendability of the flexible display panel.

Figure 5:
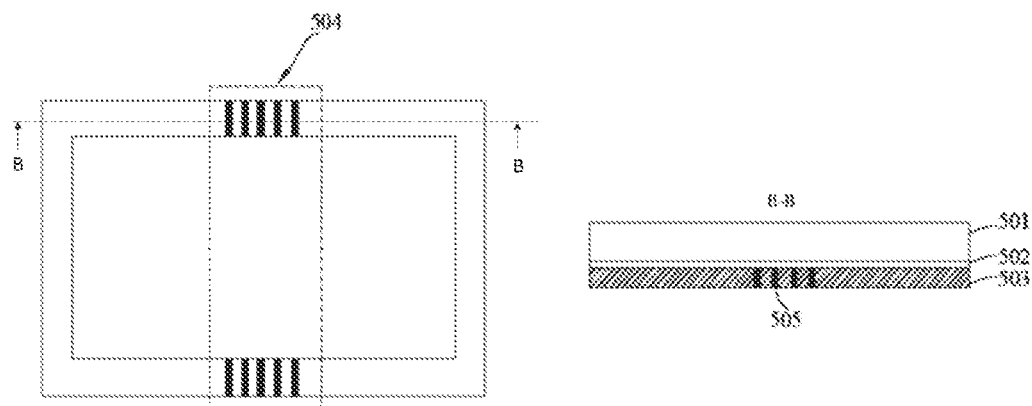
FIG. 5 is another partial schematic film layer diagram of a flexible panel and a schematic cross-sectional diagram thereof along a B-B direction according to an embodiment of the present disclosure.

As shown in FIG. 5, FIG. 5 is another partial schematic film layer diagram of a flexible panel and a schematic cross-sectional diagram thereof along a B-B direction according to an embodiment of the present disclosure. Since a plurality of patterned structures 505 are distributed at intervals and are disposed in a bending area 504 of the flexible display panel, and the patterned structures 505 can be disposed in the bending area 504 corresponding to a reinforcing layer 503 at equal intervals, the flexible display panel can be bent more easily.

At a same time, an ink layer 502 is disposed on the reinforcing layer 503, and a protective layer 501 is disposed on the ink layer 502. The protective layer 501 and the ink layer 502 are bent with bending of the reinforcing layer 503. In the embodiment of the present disclosure, in the bending area 504, the reinforcing layer 503 without being hollowed out can effectively support the protective layer 501 on the reinforcing layer 503, so problems of dents or collapse will not occur when touching the display panel in a non-display area. In another aspect, since the patterned structures 505 are also disposed in the bending area 504, when bending the display panel, the patterned structures 505 improve flexibility of the reinforcing layer 503 in this area, thereby allowing the reinforcing layer 503 in this area to be more easily bent, effectively protecting the reinforcing layer 503, and preventing the reinforcing layer 503 from breaking during bending processes.

Preferably, in an embodiment of the present disclosure, the patterned structures 505 can all be rectangular patterns, and when disposing the rectangular patterns, a width of the rectangular patterns adjacent to both sides of the bending area 504 may be greater than a width of the patterned structures positioned in a central area of the bending area 504. In addition, along the both sides of the bending area 504 to the central area of the bending area 504, the intervals among the patterned structures are gradually reduced. When patterns in a center of the bending area 504 is dense, flexibility and bendability of the reinforcing layer 503 in an area corresponding thereto are improved.

Figure 6:
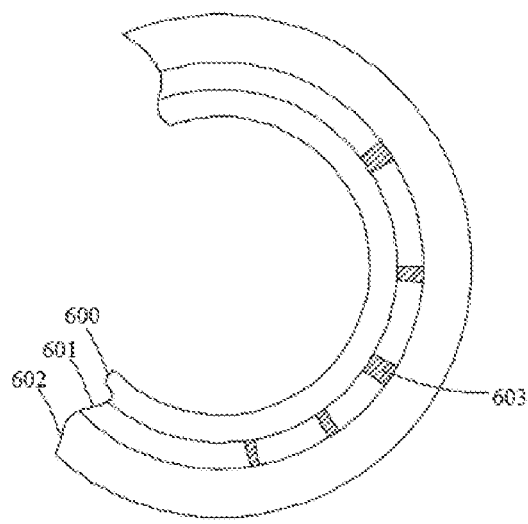
FIG. 6 is a schematic bending diagram of a flexible display panel according to an embodiment of the present disclosure.

As shown in FIG. 6, FIG. 6 is a schematic bending diagram of a flexible display panel according to an embodiment of the present disclosure. Combined with FIG. 5, FIG. 6 corresponds to a bending deformation situation of the bending area 504 in FIG. 5. When an external force acts on the flexible display panel, the display panel is under an action of the external force, and a module layer 600, a reinforcing layer 601, and a protective layer 602 are bent with the action of the external force. Since patterned structures 603 are disposed on the reinforcing layer 601, the flexible display panel can be bent easily. Meanwhile, when touching the protective layer 602 of the flexible display panel, the reinforcing layer 601 can support this area, thereby improving reliability of the display panel.

Figure 7:
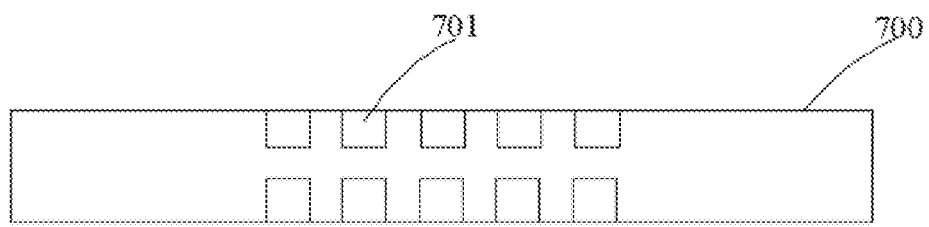
FIG. 7 is a schematic structural diagram of another reinforcing layer according to an embodiment of the present disclosure.

Further, a pattern of the patterned structures may be other shapes and structures when performing a patterning design on the reinforcing layer in the bending area. Specifically, as shown in FIG. 7, FIG. 7 is a schematic structural diagram of another reinforcing layer according to an embodiment of the present disclosure. A reinforcing layer 700 in a bending area is provided with patterned structures such as rectangular patterns 701, and the rectangular patterns are disposed on both sides of the reinforcing layer 700 in a width direction and are not disposed in a central area. Preferably, when disposing, a length direction of the patterned structures and a bending direction of the display panel can be perpendicular to each other or in parallel to each other. Perpendicular to each other is preferably selected when in design. When the display panel is bent, stresses in the bending area are reduced, and deformation is easier. Meanwhile, the length direction of the patterned structures and edges or the bending direction of the display panel may have a predetermined inclined angle according to actual needs, thereby ensuring the display panel to have a best bending effect.

Figure 8:
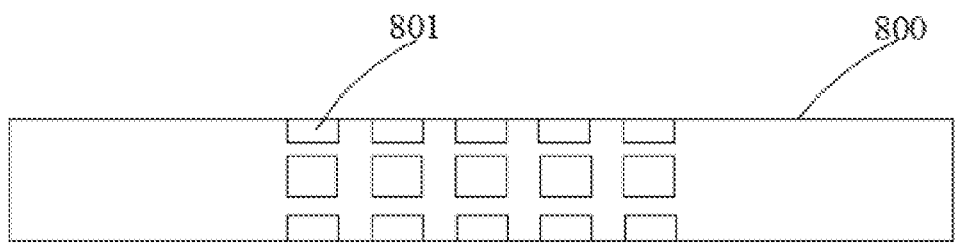
FIG. 8 is a schematic structural diagram of yet another reinforcing layer according to an embodiment of the present disclosure.

As shown in FIG. 8, FIG. 8 is a schematic structural diagram of yet another reinforcing layer according to an embodiment of the present disclosure. Combined with patterned shapes in FIG. 7, in this embodiment, patterned structures 801 can be disposed in a corresponding area of a reinforcing layer 800 in a plurality of rows. The patterned structures 801 in the plurality of rows can further increase a patterning density, and the greater the patterning density is, the higher flexibility thereof is. It can be bent more easily when bending, and after bending, bending stresses in the reinforcing layer 800 are relatively reduced. Therefore, the display panel is more stable, and reliability is higher.

Figure 9:
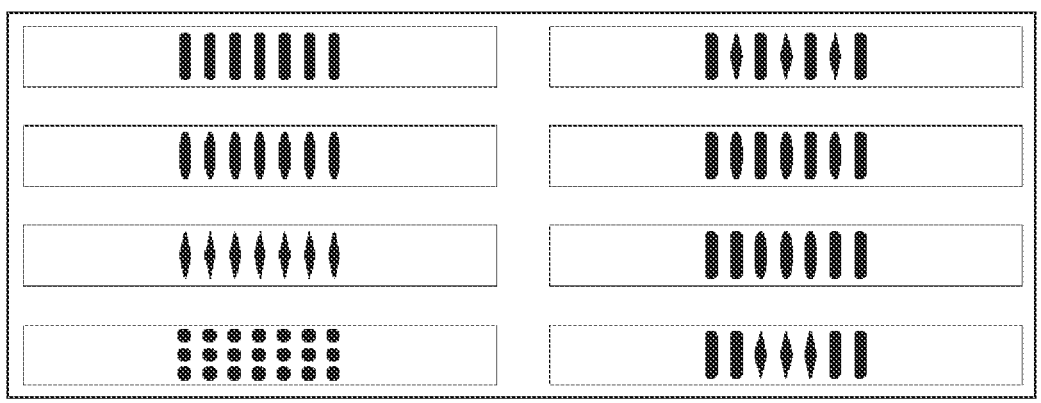
FIG. 9 is a schematic diagram of a plurality of patterned shapes of a reinforcing layer according to an embodiment of the present disclosure.

Meanwhile, the above patterned shapes can be formed at one time when disposing the patterned structures 801, so processes are simple, and it is easy to operate. As shown in FIG. 9, FIG. 9 is a schematic diagram of a plurality of patterned shapes of a reinforcing layer according to an embodiment of the present disclosure. As shown in FIG. 9, the above patterned shapes can be porous, which is a plurality of circular holes disposed in an array, and radii of the plurality of circular holes can be same or different. The above patterned shapes can also be other patterned shapes which are easily to stretch when in deformation, such as rhombuses, or ellipses. Preferably, in an embodiment of the present disclosure, the patterned shapes may also be a combination of the plurality of patterned shapes mentioned above. An objective thereof is to make the reinforcing layer easier to be bent. Meanwhile, an area of the reinforcing layer that is not hollowed out supports the protective layer, thereby improving reliability of the display panel.

Figure 10:
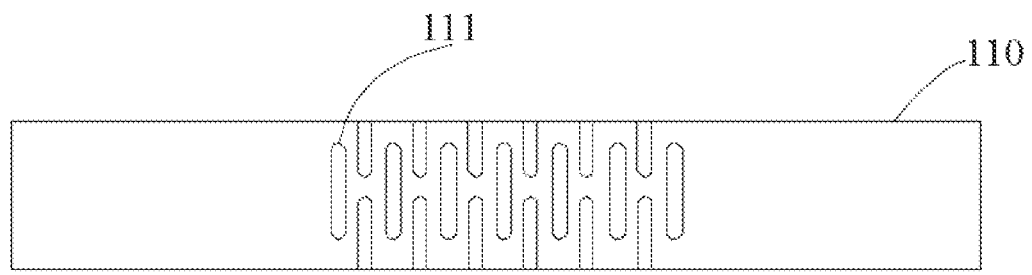
FIG. 10 is a schematic structural diagram of yet another reinforcing layer according to an embodiment of the present disclosure.

Preferably, as shown in FIG. 10, FIG. 10 is a schematic structural diagram of yet another reinforcing layer according to an embodiment of the present disclosure. Patterned structures 111 may be disposed on a reinforcing layer 110 at equal intervals, and a length direction of the patterned structures 111 is arranged along a width direction of the reinforcing layer 110. In a central area of the reinforcing layer 110 in the width direction, the patterned structures 111 in complete are disposed, and on both sides of the reinforcing layer 110 in the width direction, the patterned structures 111 in partial are disposed. The reinforcing layer 110 supports a protective layer in a non-display area.

Meanwhile, in the embodiment, since the patterned structures 111 are disposed on the reinforcing layer 110, and a length of the patterned structures 111 is greater than a width thereof, when an external force acts thereon, the patterned structures 111 are easier to have slight deformation, thereby allowing the flexible display panel to be bent more easily. Meanwhile, the embodiment of the present disclosure effectively reduces a film layer thickness of the display panel by disposing the patterned structures 111 on the reinforcing layer 110, thereby realizing a design of thinner middle frames and bezels and a design of lightness and thinness. In addition, the display panel in the embodiment has good strengths on edges, thereby preventing problems of ease of deformation by an external force. Meanwhile, supportive structures of front frames or middle frames in the non-display area in current design can be omitted due to effect of the reinforcing layer, thereby finally realizing a front frameless design.

Further, an embodiment of the present disclosure further provides a display device. The display device includes structures of the display panel provided in the embodiments of the present disclosure. A stiffness of film layers in the non-display area of the display panel is greater than a stiffness of film layers in the display area. Meanwhile, the reinforcing layer is disposed in the non-display area, thereby effectively supporting the display panel in the non-display area and improving the reliability and the quality of the display panel.

The display panel and the display device provided by the present disclosure are described in detail above. The description of the above embodiments is only for helping to understand the technical solution of the present disclosure and its core ideas, and it is understood that many changes and modifications to the described embodiment can be carried out without departing from the scope and the spirit of the disclosure that is intended to be limited only by the appended claims.

What is claimed is:

1. A display panel, having a display area and a non-display area surrounding the display area and comprising:
    a module layer; and
    a protective layer disposed on the module layer;
    wherein a stiffness of the protective layer corresponding to the non-display area is greater than a stiffness of the protective layer corresponding to the display area; and
    the display panel further comprises a reinforcing layer disposed between the protective layer and the module layer, the protective layer corresponding to the non-display area is formed with grooves, and the reinforcing layer is disposed in the grooves and attached to the protective layer.

2. The display panel according to claim 1, further comprising an adhesive layer disposed between the reinforcing layer and the protective layer.

3. The display panel according to claim 1, comprising a planarization area and a bending area adjacent to each other, wherein the display panel corresponding to the bending area is bendable.

4. The display panel according to claim 3, wherein the reinforcing layer corresponding to the bending area is provided with patterned structures.

5. The display panel according to claim 4, wherein a planar shape of the patterned structures comprises porous, square, rhombic, oval, or a combination thereof.

6. The display panel according to claim 5, wherein the patterned structures comprise discontinuous grid structures, and a length direction of the patterned structures is perpendicular to a bending direction of the display panel.

7. The display panel according to claim 1, wherein the module layer comprises a polarizer layer, an insulating layer, a display device layer, and a backplate layer disposed in sequence, and the protective layer comprises a glass cover.

8. A display panel, having a display area and a non-display area surrounding the display area and comprising:
    a module layer;
    a protective layer disposed on the module layer; and
    a reinforcing layer disposed between the protective layer and the module layer, wherein the reinforcing layer is disposed in the non-display area corresponding to the protective layer to support the protective layer;
    wherein a stiffness of the protective layer corresponding to the non-display area is greater than a stiffness of the protective layer corresponding to the display area.

9. The display panel according to claim 8, wherein the protective layer corresponding to the non-display area is formed with grooves, and the reinforcing layer is disposed in the grooves and attached to the protective layer.

10. The display panel according to claim 8, further comprising an adhesive layer disposed between the reinforcing layer and the protective layer.

11. The display panel according to claim 8, comprising a planarization area and a bending area adjacent to each other, wherein the display panel corresponding to the bending area is bendable.

12. The display panel according to claim 11, wherein the reinforcing layer corresponding to the bending area is provided with patterned structures.

13. The display panel according to claim 12, wherein a planar shape of the patterned structures comprises porous, square, rhombic, oval, or a combination thereof.

14. The display panel according to claim 13, wherein the patterned structures comprise discontinuous grid structures, and a length direction of the patterned structures is perpendicular to a bending direction of the display panel.

15. The display panel according to claim 8, wherein the module layer comprises a polarizer layer, an insulating layer, a display device layer, and a backplate layer disposed in sequence, and the protective layer comprises a glass cover.

16. A display device; having a display area and a non-display area surrounding the display area and comprising a display panel, wherein the display panel comprises:
    a module layer;
    a protective layer disposed on the module layer; and
    a reinforcing layer disposed between the protective layer and the module layer, wherein the reinforcing layer is disposed in the non-display area corresponding to the protective layer to support the protective layer;
    wherein a stiffness of the protective layer corresponding to the non-display area is greater than a stiffness of the protective layer corresponding to the display area.

17. The display device according to claim 16, wherein the protective layer corresponding to the non-display area is formed with grooves, and the reinforcing layer is disposed in the grooves and attached to the protective layer.

* * * * *